Figure 3:
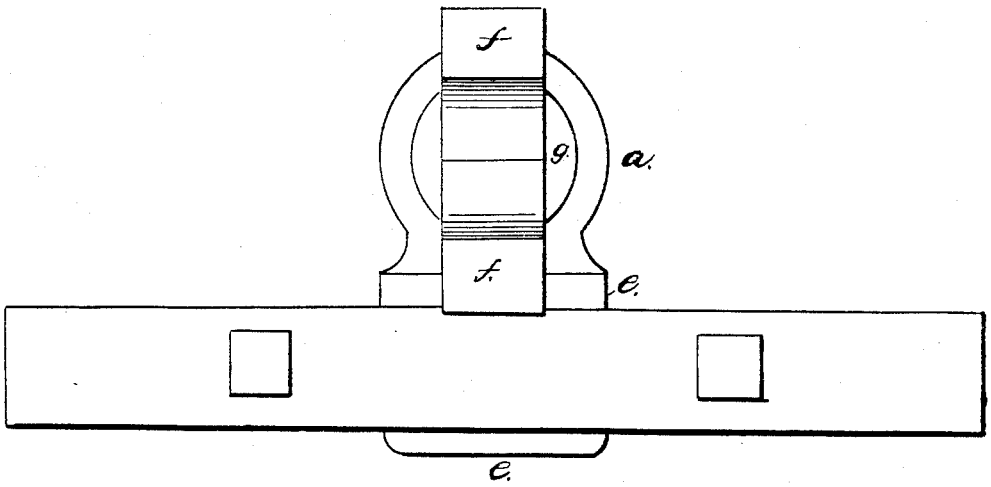

Examiner

BEST AVAILABLE COPY

Sheet 1, 2 Sheets.

BEST AVAILABLE COPY

A. J. Gibson.
Running Gear.
11,668
No. 144
A. J. Patented May 27, 1856.

Additional Improvement to Pat. No. 11,668.

bolt to hold spring in place.

spring seat.

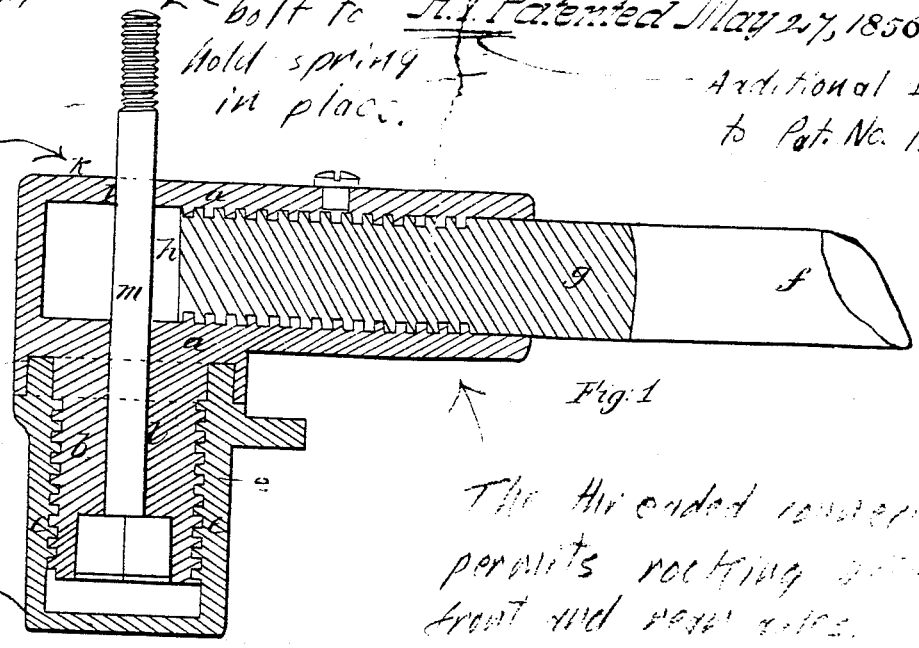

Fig. 1

The threaded connection permits rocking between front and rear axles.

mounted on center of front axle.

The threaded connection is the seat spring front axle connection

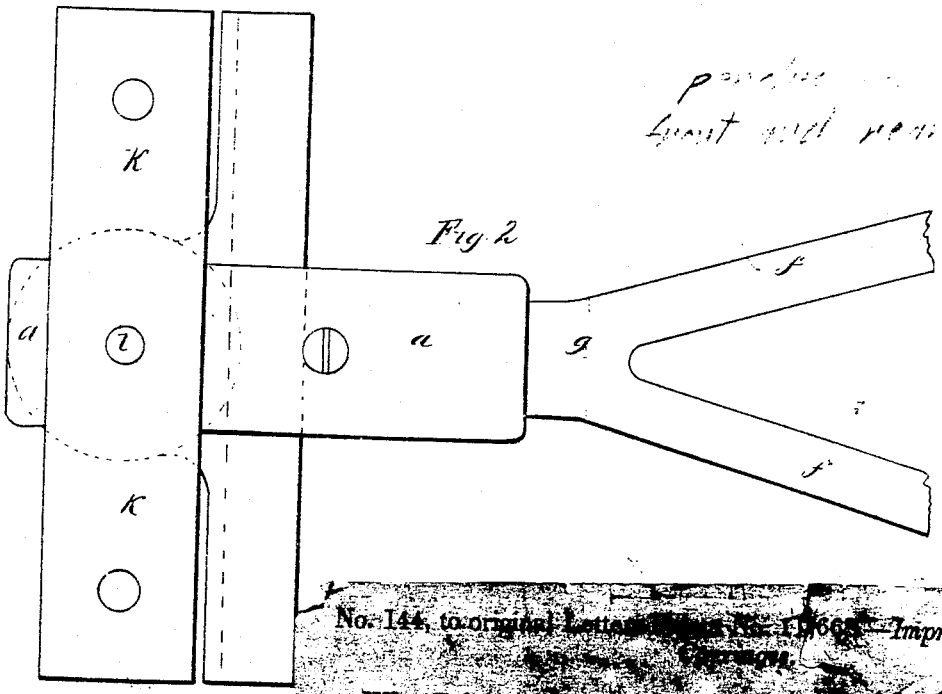

Fig. 2 permits rocking between front and rear axles

No. 144, to original Letters Patent No. 11,668.—*Improved Coupling for Carriages.*

What I claim is, arranging above the threaded bolt and with respect to the guard [illegible] which is extended, as described, a seat or connexion for the spring or other part of a carriage, as specified.

I also claim arranging in the threaded bolt and so as to pass up through it and its rest, a [illegible] or [illegible] for the reception of a screw-bolt, serving not only [illegible] bar down upon the seat, but for the special purpose of preventing accident in case of breakage of the [illegible] bolt or its seat, as specified.

ABRAM J. GIBSON.

BEST AVAILABLE COPY

Sheet 2, 2 Sheets.

A. J. Gibson.

Running Gear.

No. 144. A. I. Patented May 27, 1856.

N. PETERS PHOTO-LITHOGRAPHER, WASHINGTON, D. C.